May 10, 1960
R. A. KRAUS ET AL
2,936,014
RESILIENT INSERT CONSTRICTED TO SMALLER DIAMETER UPON INSERTION
IN BASE MEMBER THEREUPON EXPANDED TO GREATER
DIAMETER TO AFFORD A FRICTION LOCK
Filed July 24, 1957
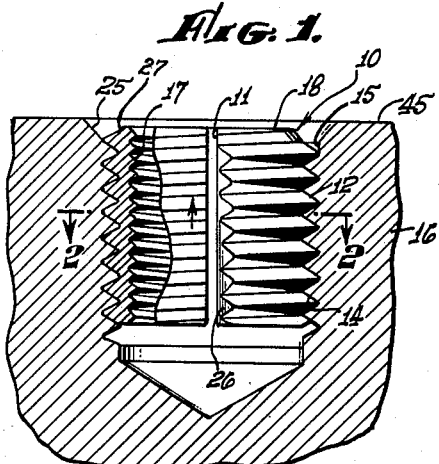
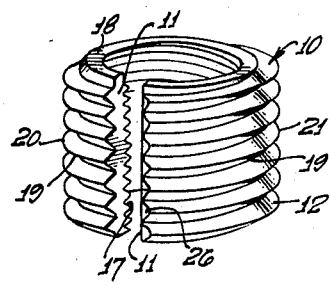
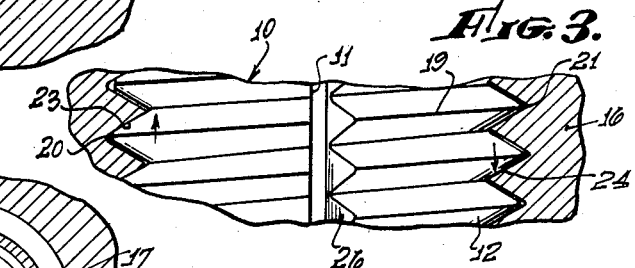
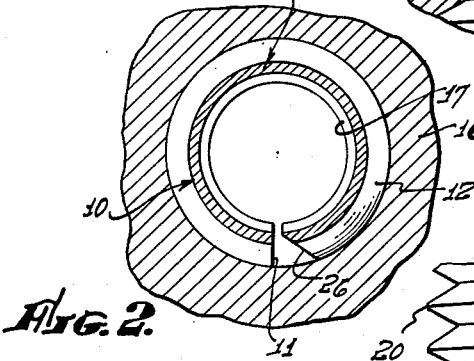
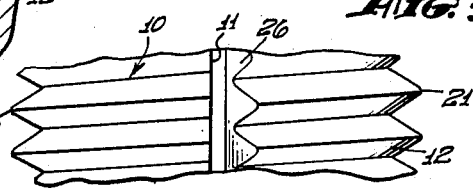
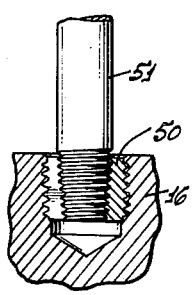
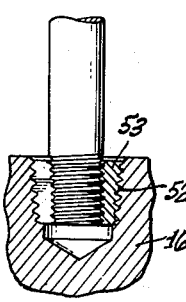
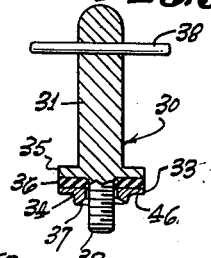
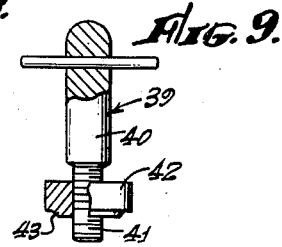
Robert A. Kraus,
Edmund J. Kraus,
INVENTORS.
By William Q. Spensley
Spensley & Horn ATTORNEYS.

United States Patent Office 2,936,014
Patented May 10, 1960

2,936,014

RESILIENT INSERT CONSTRICTED TO SMALLER DIAMETER UPON INSERTION IN BASE MEMBER THEREUPON EXPANDED TO GREATER DIAMETER TO AFFORD A FRICTION LOCK

Robert A. Kraus and Edmund J. Kraus, Redondo Beach, Calif.

Application July 24, 1957, Serial No. 673,977

3 Claims. (Cl. 151—41.74)

This invention relates to fastening devices, and more particularly to an insert for fastening threaded objects to a parent material.

In order to fasten threaded objects, such as machine screws, bolts, studs, self-tapping screws and the like, to materials, such as plastics, wood, aluminum, magnesium plates and castings, and other materials which have insufficient shearing strength to allow the fastening of the threaded object directly in the material, inserts are used to increase the shear area of the materials. Various types of such inserts are well known to the art. The inserts must be capable of being affixed within the material to increase the shear area of the material and must withstand stresses and vibrations without loosening from the parent material. In addition, the insert must permit the application of standard threaded objects, such as bolts, without danger of stripping threads. Also the insert must allow the frequent insertion and removal of the threaded object without damage to the internal threads of the insert or removal of the insert from the parent materal.

Various difficulties are encountered in inserts known to the art prior to the present invention. For example, a common type of insert is a self-tapping insert which is tapped into a drilled hole in the parent material. Although such inserts are satisfactory for many applications, difficulty is encountered in the use of such inserts in brittle material, such as plastic, due to chipping or cracking as the insert is driven into place. In addition, the material removed from the hole during the tapping operation will come off in chips or strings which are not easily removable. Various other inserts are known which utilize a secondary locking piece to prevent rotation of the insert within the parent material. However, such inserts are expensive in quantity and an extra operation is necessary to the parent material when such an insert is used.

The primary requisite for such inserts is, of course, that they do not rotate within the parent material when positioned to receive a fastener. Also, they should be inexpensive to manufacture and easy to install and remove with a minimum number of operations required to the parent material.

Accordingly, it is an object of the present invention to provide an improved insert for fastening threaded objects to parent material which is easily inserted into and removed from the parent material.

It is another object of the present invention to provide an improved insert for fastening a threaded object to a parent material which will not rotate with the threaded object when in place in the material.

It is another object of the present invention to provide an improved fastener insert which has a large shear area in contact with the parent material.

Still another object of the present invention is to provide a fastener insert which is inexpensive to manufacture and install.

An insert in accordance with the present invention comprises a tubular sleeve having a longitudinal slit of substantial width extending throughout the length of the sleeve. The insert is adapted for insertion into the threaded bore of a parent material and is externally threaded with threads adapted for engagement with the threaded bore. The external threads are, however, slightly greater in diameter than the internal threads of the bore. The sleeve is internally threaded for the reception of a threaded object.

The novel features which are believed to be characteristic of the invention, both as to its organization and method of operation, together with further objects and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

Figure 1 is a partially sectional view of an insert in accordance with the present invention in assembled position within the parent material;

Figure 2 is a view taken along line 2—2 of Figure 1;

Figure 3 is an enlarged partial view corresponding to Figure 1;

Figure 4 is a perspective view of a presently preferred embodiment of the insert removed from the parent material;

Figure 5 is an enlarged view of the external threads of the insert when reduced in diameter but not assembled within the parent material;

Figure 6 is an alternative embodiment of the present invention as used to fasten a stud bolt to the parent material;

Figure 7 is a second alternative embodiment utilized for fastening a stud bolt;

Figure 8 is a view in cross-section of the tool used to position the insert within the parent material; and Figure 9 is a view in cross-section of the tool used to remove the insert from the parent material.

Referring now to the drawing, and particularly to Figures 1 through 5, a presently preferred embodiment of the present invention is shown in perspective view in Figure 4. The insert 10 is a sleeve of substantially uniform internal and external diameter with a longitudinal slit 11 of predetermined width extending throughout the length of the insert. In the noninserted condition, as shown in Figure 4, the insert has an external thread 12 which is mateable with the internal thread 14 of the threaded bore 15 in the parent material 16, except that the major diameter of the insert 10 is slightly greater than the major diameter of the receiving threads 14 of the bore 15. That is, referring to Figures 1 and 4, the insert is formed of material having a substantial degree of resiliency such that the normal configuration of the insert is as shown in Figure 4 with a longitudinal slit of predetermined circumferential width. In the normal relaxed configuration of Figure 4, the external threads 12 of the insert are aligned across the slit 11 and are at a uniform pitch angle which corresponds to the pitch angle of the internal threads 14 of the threaded bore in which the insert is to be positioned. The major diameter of the external threads 12 of the insert is slightly greater than the major diameter of the internal threads 14 of the bore 15. The increased diameter of the insert is less, however, than the change of diameter of the insert which can be obtained by deforming the insert to compress the slit 11. Thus, the insert is formed, for example, by forming internal and external threads upon a tubular sleeve having an outside diameter slightly greater than the diameter of the bore into which the insert is to be placed. After the sleeve has been internally and externally threaded, the slit is formed by milling or other means well known to the art. The width of the slit 11 is predetermined such that the insert may be circumferentially reduced to reduce the width of the slit and accordingly to reduce the major diameter of the insert until it is substantially equal to but less than the major diameter of the threaded bore into which it is to be inserted. The internal threads 17 of the insert are formed to receive the bolt or fastener which is to be secured within the insert and thus within the parent material 16.

Referring now to Figure 5, it may be seen that when the diameter of the insert 10 is radially reduced from the normal diameter of Figure 4, the slit 11 is narrowed and the external threads 12 of the insert will no longer be coextensive across the slit. As shown in Figure 5, if the diameter across the crests of the threads is reduced, he helix angle must increase if the crests of the threads are moved radially inward with no axial displacement. That is, referring to Figures 4 and 5, the crest 19 of a single thread progresses from the crest point 20 to the crest point 21 at the opposite side of the thread along a crest line 19 which is interrupted by the width of the slit 11 but which is aligned across the slit when the insert is in the normal condition of Figure 4. When the diameter is reduced, however, the pitch of the threads remains constant, if the diameter is reduced radially with no axial displacement, and the helix angle must increase. Thus, the crest line 19 must move the same vertical distance between crest points 20 and 21, but it must do so in a shorter distance across the diameter of the threads. Therefore, the crest points 20 and 21 will move radially inward in Figure 5, the slit 11 will be narrowed, and the crest line 19 will no longer be aligned across the slit.

Referring now to Figures 1 and 3, when the insert 10 is positioned within the mateable threaded bore of the parent material, the internal threads 14 of the bore 15 force the external threads 12 substantially to assume the pitch or helix angle of the internal threads 14 which correspond to the angle of the threads of the insert in the normal, or relaxed condition. Since the insert 10 is reduced in diameter against its normal resiliency the insert must undergo an axial deformation to assume the required pitch angle and an interference fit is produced. That is, referring now to Figure 3, the insert 10 is shown in the position it assumes when inserted into the parent material. It may be seen that the crest line 19 is again substantially aligned across the slit 11 which has been reduced in width. The alignment is forced by the internal threads of the bore but since the insert is urged by its radial resiliency to assume the condition of Figure 4 or by its axial resiliency to assume the condition of Figure 5, an interference fit is obtained and the insert cannot be rotated within the bore. Therefore, the insert is axially deformed causing an upward axial force at the left side of Figure 3 and a downward axial force at the right side of Figure 3. As shown in the figure the axial forces cause the upper side of the external threads 12 to be in pressure contact with the lower side 23 of the internal threads 14 at the left side of the figure, while the lower side of the external threads at the right side of the figure are in pressure contact with the upper side 24 of the internal threads 14 of the bore. Thus, a substantial interference fit is obtained which prevents rotation of the insert within the bore 15 when the insert is in the position shown in Figure 3.

In order to thread the insert into the parent material it is preferable that a slight chamfer 25 be provided at the edge of the bore to begin the reduction in diameter of the insert. Also, in order to prevent gouging of the internal threads of the bore it is preferable that the leading edge 26 of the slit 11 be slightly chamfered or slightly displaced radially inward, as shown in Figure 2, to move the edge out of contact with the bore 15 during rotation of the insert into the bore. Although the slit 11 is shown to be formed with sides that are substantially radial with respect to the insert, it is sometimes advantageous to form the slit 11 such that the sides are at a substantial angle with the radius of the sleeve. That is, rather than a chamfer on the leading edge of the slit gouging is prevented if the sides of the slit are set at an angle with the leading edge of the slit being inclined inwardly and away from the internal threads of the bore. In addition to the prevention of gouging, it is then possible to identify the outward and inward end of the insert by referring to the direction of the angle of the slit through the wall of the sleeve. Further, although the slit is shown to be straight and axially oriented, it is necessary only that it extend throughout the length of the sleeve to allow a decrease in diameter of the sleeve. Thus, it may assume a zigzag form or be positioned at an angle to the longitudinal axis of the sleeve.

Referring now to Figure 8, the presently preferred embodiment of the insertion tool 30 used to position the insert within the threaded bore is shown. The insertion tool 30 comprises a stem 31 which is male threaded at one end. The threads 32 are formed to be mateable with the internal threads of the insert in the reduced diameter condition of the insert. Positioned proximate the threaded end of the stem is a pressure plate 33 which has an opening therethrough which is substantially equal to, but greater in diameter than, the diameter of the threaded portion 32 of the stem. Thus, the plate symmetrically surrounds the stem but is not affixed thereto. A shoulder 34 is provided on the plate and has a diameter slightly less than the major diameter of the threaded bore 15. Positioned along the stem 31 proximate the plate 33 but spaced therefrom is a bearing flange 35. The flange 35 is affixed to the stem 31 or is an integral part thereof. Between the flange 35 and plate 33 is a resilient disc 36 of elastomeric or similar resilient material. The resilient disc 36 is affixed to the flange 35 at one face and to the plate 33 at the other face by vulcanization or similar affixing means known to the art. Thus, the plate 33 is spaced from, but connected to, the flange 35 by the resilient disc 36. The threads 32 extend along the length of the stem at least to the surface 37 of the shoulder 34 when the resilient disc is in the compressed condition as described hereinafter. A turning handle 38 is affixed to the stem.

Although not essential to the present invention, it is preferable to provide a chamfer 27 upon the upper end of the insert which is upwardly convergent, and to provide a mating face upon the surface 37 of the insertion tool. Thus, an upwardly convergent face 37 upon the shoulder 34 is shown in Figure 8, which will exert an inward radial force upon the insert when a downward force is exerted upon the chamfered end of the insert as described more fully hereinafter.

Referring to Figure 9, a presently preferred embodiment of the removal tool 39 to be used in removing the insert 10 from the parent material is shown. The removal tool 39 comprises a stem 40 which is male threaded over the end portion thereof with male threads 41 which are engageable with the internal threads 17 of the insert 10. A pressure nut 42 is threadably engaged with the threaded end 41 of the stem and has a shoulder 43 which extends beneath the lower face of the nut 42. The shoulder has a diameter substantially equal to but less than the major diameter of the insert 10 and is substantially mateable with the upper end of the insert. A turning handle is affixed to the stem 42 in order to rotate the stem and an engageable surface is formed on the exterior surface of the nut in order to rotate the nut upon the stem.

In assembling the insert 10 into the threaded bore of the parent material 16 the insert 10 is initially in the relaxed condition as shown in Figure 4 with the threads in alignment across the slit 11. The insert 10 is then threaded onto the threaded portion 32 of the insertion tool until the upper surface 18 of the insert abuts the shoulder surface 37 of the pressure plate 33. The insert is then threaded into the threaded bore 15 by rotating the insertion tool 30. As the insert is threaded inward past the chamfer 25 it is forced to assume the slightly smaller diameter of the threaded bore as previously described and shown in Figure 3. That is, the diameter of the insert is decreased by decreasing the width of the slit 11. Since the external threads 12 of the insert are mateable with the internal threads 17 of the bore 15 the external threads 12 are maintained in substantial alignment across the narrowed slit. In order to obtain the alignment it is necessary that the insert undergo a slight axial displacement at each side of the slit 11 as discussed hereinbefore and indicated in Figures 1 and 3. The resilient disc 36 which maintains the pressure plate 33 in position allows the axial deformation to a degree which is sufficient to allow insertion of the insert. On the other hand, the disc 36 also resists the deformation sufficiently to prevent a locking interference between the threads 12 of the insert and the threads 14 of the bore to allow the insert to be threaded completely into the bore. As the insertion tool is rotated to thread the insert inward the upper surface 18 of the insert will be moved below the surface 45 of the parent material and recessed due to the shoulder 34. In addition, the sloping surface 37 of the shoulder exerts an inward radial force upon the insert due to the chamfered end of the insert. Thus, the insert is threaded into the bore until the lower surface 46 of the pressure plate is in contact with the surface 45 of the parent material 16 and the resilient disc 36 is compressed. As the surface 46 of the pressure plate comes into contact with the surface 45 of the parent material it resists further rotation and imposes a torque upon the resilient disc, since the upper face of the disc which is affixed to the flange 35 is still rotated with the flange. Thus, the resilient disc is compressed and at the same time twisted as the insert becomes fully positioned within the bore. The torque upon the resilient disc therefore urges a reverse rotation upon the stem 31 and threads 32. Accordingly, after the insert has been positioned it is found that the insertion tool is easily removed from the insert without disturbing the position of the insert since the initial reverse rotation of the stem is urged by the disc. This torque action of the disc 36 allows the disengagement of the threads 32 on the stem 31 from the internal threads 17 of the insert and the insertion tool is easily turned out of the insert while leaving the insert in place. After the insertion tool has been removed the insert is firmly locked against rotation by the friction tight interference fit between the threads 12 and 14 produced by the resiliency of the insert acting against the radial and axial deformation from the relaxed condition of Figure 4 as discussed hereinbefore. Accordingly, a threaded fastener such as a bolt, not shown, may be threaded into the internal threads 17 of the insert and securely fastened to the parent material. The threaded bolt or other member which is to be held within the insert can be threaded into and removed from the insert without rotating or otherwise changing the position of the insert within the parent material.

In order to remove the insert 10 from the threaded bore after the bolt or other fastener has been removed, the threads 41 of the removal tool are turned into the internal threads 17 of the insert. When the threads 41 have been sufficiently advanced into the insert the pressure nut 42 is turned downward until the shoulder 43 abuts the surface 18 of the insert. The pressure nut is turned downward until the force of the shoulder acting upon the surface of the insert nullifies the axial force of the insert and locks the insert upon the threads 41 of the removal tool 39. That is, the shoulder 43 exerts a force upon the upper surface 18 of the insert which opposes the upward axial force of the insert at one side of the slit 11 and relieves the pressure between the upper side of the external threads 12 and the lower side of the internal threads 14 of the bore 15 to partially remove the interference fit. Thus, the friction between the internal threads 17 of the insert and the threads 41 of the removal tool under the force of the pressure nut 42 is greater than the friction existing between the insert and parent material and the insert is easily threaded out of the bore by turning the removal tool. It should be noted that due to the recess of the upper surface 18 of the insert beneath the surface 45 of the parent material a head or flange upon the threaded member secured within the insert cannot exert such a force upon the insert surface 18 to relieve the axial forces during use of the insert.

As discussed hereinbefore, from the foregoing it may be seen that although a slit 11 which is parallel to the longitudinal axis of the insert has been shown as illustrative, the slit may be positioned at an angle with the axis. It is necessary only that the slit 11 allow the required decrease in radius of the insert and the accompanying axial deformation. The insert 10, insertion tool 30 and removal tool 39 may be made of any suitable material and the dimensions thereof may be varied to meet the requirements of any given application of the present invention. The amount by which the major diameter of the insert in the non-inserted condition is greater than the major diameter of the threaded bore, and the width of the slit 11 may be readily determined for optimum conditions for any given use of the insert by one skilled in the art in view of the foregoing. Various modifications of the invention may be made to meet particular conditions within the scope of the invention. For example, in order to lock a bolt or threaded fastener in place in the insert 10 it is sometimes desirable to form one corner of the insert near the lower end of the slit 11 such that it is displaced radially inward to provide a threaded portion of reduced diameter to more securely engage the threaded member.

Also, referring now to Figure 6, an embodiment of the present invention is shown which is especially adapted for securing stud bolts or similar members which must be substantially non-rotatably retained within the parent material. The external configuration of the insert 50 of Figure 6 is similar to that previously described and the manner of insertion and removal is identical, the difference being that the internal threads of the insert are tapered to receive correspondingly tapered threads on the stud bolt 51 or similar member. Thus, when turned into the insert 50 the bolt 51 becomes substantially locked in place within the insert.

Referring to Figure 7, an alternative embodiment is shown in which the external threads 52 of the insert 53 are tapered while the internal threads are of substantially uniform diameter. The tapered threads 52 are similar to standard pipe threads and the internal threads of the parent material are formed to be mateable.

Thus, the present invention provides an improved insert for fastening threaded objects to a parent material to increase the shear strength of the parent material. An insert in accordance with this invention will withstand stresses and vibrations without loosening from the parent material. Threaded objects may be threaded into or out of the insert without loosening the insert or changing the position of the insert within the parent material. The insert can be easily and economically fabricated and can be easily inserted into, and removed from the parent material with a minimum number of manufacturing operations necessary to the parent material.

What is claimed is:

1. An insert for fastening a threaded object to a parent material comprising: a tubular sleeve, said tubular sleeve being externally threaded at a normal first diameter, said tubular sleeve defining a slit through the wall of said sleeve extending throughout the length of said sleeve, said slit having a predetermined width sufficient to allow the contraction of said sleeve to a second diameter, less than said first diameter, said second diameter corresponding to the diameter of an internally threaded bore in said parent material, said external threads being engageable with the internal threads of said bore at said second diameter, said sleeve being formed of material whereby said sleeve is continually urged to said first diameter, said sleeve being internally threaded for engagement by a threaded member, said external threads and said internal threads of said sleeve being substantially aligned across said slit at said first diameter of said sleeve and also being entirely confined by an imaginary cylinder having said first diameter so as to reduce any possibility of localized impingement into the surface of said bore and being axially relatively shifted out of alignment upon contraction of said sleeve to said second diameter, whereby an interference fit is provided between said sleeve and said threaded bore when said sleeve is axially and radially deformed within said bore at said second diameter, a leading edge of said slit being inclined away from the internal threads of the bore so as to avoid gouging the threads of the bore during application of the insert to the bore.

2. An insert in accordance with claim 1 wherein said slit is defined through the wall of said tubular sleeve by sides which are substantially parallel and at a substantial angle with respect to a radial line of said sleeve, and wherein said angle positions the leading edge of said slit away from the internal threads of said threaded bore.

3. An insert in accordance with claim 1 wherein the outer end surface of said tubular sleeve in said parent material is outwardly convergent.

References Cited in the file of this patent

UNITED STATES PATENTS

| | | |
|---|---|---|
| 591,062 | Smith | Oct. 5, 1897 |
| 847,774 | Hoffman | Mar. 19, 1907 |
| 1,080,332 | Dodds | Dec. 2, 1913 |
| 1,277,146 | Stanek | Aug. 27, 1918 |
| 1,762,394 | Hosking | June 10, 1930 |
| 1,785,847 | Valentine | Dec. 23, 1930 |
| 2,244,046 | Bradshaw | June 3, 1941 |
| 2,443,466 | Lord | June 15, 1948 |
| 2,756,791 | Ferrara | July 31, 1956 |